Feb. 27, 1968  R. I. NEWMAN ET AL  3,370,938
METHOD AND APPARATUS FOR CONTROLLING
PARTICLE SIZE OF FLUIDIZED BEDS
Filed July 30, 1965  3 Sheets-Sheet 1

INVENTORS:
ROBERT I. NEWMAN
WILLIAM E. WATSON
BY
*Jay P. Friedenson*
ATTORNEY

INVENTORS:
ROBERT I. NEWMAN
WILLIAM E. WATSON
BY
*Jay P. Friedenson*

ATTORNEY

United States Patent Office 3,370,938
Patented Feb. 27, 1968

3,370,938
METHOD AND APPARATUS FOR CONTROLLING PARTICLE SIZE OF FLUIDIZED BEDS
Robert I. Newman, Allendale, and William E. Watson, Mount Tabor, N.J., assignors to Allied Chemical Corporation, New York, N.Y., a corporation of New York
Filed July 30, 1965, Ser. No. 476,110
12 Claims. (Cl. 75—9)

ABSTRACT OF THE DISCLOSURE

There are disclosed a method and apparatus for controlling particle size in fluidized beds and more particularly for removing relatively coarse or agglomerated solid particles from a fluidized bed containing the same. This may be accomplished by feeding finely divided solid charge to and across a fluidized bed from a laterally localized inlet; flowing relatively coarse or agglomerated feed particles downwardly from the bottom of the bed, at a point laterally remote from the laterally localized inlet, through a restricted column openly communicating at its top with the bed bottom and passing a second fluidizing gas upwardly through the column and the bed at a sufficient velocity to maintain the portion of the bed in the column in a fluidized state, which velocity is higher than the velocity of the first fluidizing gas and which velocity is further controlled so as to cause particles of undesired coarseness to settle to the bottom of the column and to cause particles of desired fineness to be carried above the column and back into the portion of the bed above the column and withdrawing from the bottom of the column the particles of undesired coarseness. The method is particularly applicable for establishing and maintaining optimum size patterns of particles of roasted or partially roasted metal sulfide ores in fluidized processes for the conversion of such ores to $SO_2$ and the corresponding metal oxides.

Background of the invention

The fluidized bed technique is widely employed to bring about effective contact between gases and solids and accompanying physical or chemical changes. Physical changes which have commonly been brought about by this technique include separation and purification of gases by solid adsorbents and drying of various solids. Chemical changes which have been effected by this technique are extensive and include a wide variety of chemical reactions, such as oxidation, reduction, halogenation, polymerization, hydrogenation, dehydrogenation, cracking, alkylation, isomerization and numerous synthetic processes.

It is evident that, with other variables optimized, the more closely a fluid bed approaches true fluidization, the more efficient will be the operation being carried out in the fluid bed. It is well known that one of the primary factors required for good fluidization is a fluid bed composed of particles spread through a range of sizes, i.e., not only should the particles not all be of one size, but they should neither be too large nor too small. The optimum degree of spread and the optimum upper and lower limits of particle size will vary with the materials involved as well as with the operating conditions of the system. These optimum values may readily be determined for any given system, however, by correlating various size patterns with other critical variables in relation to the results obtained.

As a general rule, it is desirable to work with a fluidized bed which contains a large proportion of relatively fine particles as opposed to the weight of relatively coarse particles present. This is because relatively coarse particles do not possess as much surface area as would an equivalent weight of relatively fine particles and the result is a loss in efficiency of contact between the solids present and the gas with which they are to be contacted. Additionally, coarse particles have poor flow characteristics in solids transfer lines and they also increase wear and erosion of equipment.

Particles possessing the desired size characteristics may be charged to a bed, unfortunately however, there are a number of physical and chemical phenomena which frequently operate to disturb the balance of particle size and distribution in the bed. For example, average particle size may be reduced by attrition caused by abrasion resulting from the many collisions between bed particles. A more serious problem, and the one which has inspired the corrective measures of this invention, is the increasing of average particle size through combination of particles or by coating of particles with reactant or product of reaction. Although varying names have been given to the latter phenomenon under various conditions; for the purposes of this discussion, any increase in particle size of bed material will be referred to as agglomeration.

Agglomeration is common in many fluidized bed processes and, for the reasons described heretofore, must be compensated for or corrected in order to optimize results. The problem of agglomeration is particularly acute in roasting operations wherein metal sulfide ores are oxidized to $SO_2$ and the corresponding metal oxides. In such roasting operations, it is particularly desirable to oxidize the ore as completely as possible in order to obtain metal oxide product having as low a sulfur content as is possible. Even very low percentages of residual sulfur content considerably complicates further metallurgical processing of such products.

Prior art techniques for counteracting the effects of agglomeration in a fluidized bed are generally characterized by the steps of removing a portion of the bed material, separating fines from coarse by screening, elutriation or other conventional technique, disposing of the separated relatively coarse particles and returning the separated relatively fine particles to the bed, thereby reducing the average particle size within the bed. These methods require the use of extensive and costly equipment needed to effect the above described operations and to accomplish transfer of the bed material and the separated fines from place to place. Inherent disadvantages in such methods are those of large operating and maintenance costs. Moreover, as many fluidization operations are carried out at elevated temperatures, it has been necessary to provide that such equipment be of particularly costly design to withstand high operating temperatures, or alternatively, that the bed material to be sized be cooled prior to sizing, thereby upsetting, in many cases, critical heat balances. Still other prior art methods which have depended, for bed sizing, upon the principle of elutriation of the particles within the fluidized bed itself by the fluidizing medium employed, have not proved to be effective in accomplishing the intended purpose.

It is accordingly an object of the invention to provide an improved method and apparatus for removing relatively coarse or agglomerated solid particles from a fluidized bed containing the same, thereby decreasing the average size of the bed particles therein.

It is a more specific object of the invention to provide a more simple, more economical and more efficient method and apparatus, than has been known heretofore, for separating relatively coarse or agglomerated solid particles from relatively fine solid particles contained in a fluidized bed, for returning the separated relatively fine particles to the bed proper and for eliminating the separated relatively coarse or agglomerated solid particles from the system.

Another specific object of the invention is to provide an improved method and apparatus for establishing and maintaining optimum size patterns of solid particles in fluidized beds.

A preferred object of the invention is to provide a simple, economical and efficient method and apparatus for removing relatively coarse or agglomerated roasted or partially roasted metal sulfide ore particles from a fluidized bed roaster containing the same, during normal operation of the roaster, thereby decreasing the average size of the bed particles contained therein.

A preferred specific object of the invention is to provide a more simple, more economical and more efficient method and apparatus than has been known heretofore for separating relatively coarse or agglomerated roasted or partially roasted metal sulfide ore particles from relatively fine metal sulfide ore particles contained in a fluidized bed roaster, for returning the separated relatively fine bed particles to the bed proper and for eliminating the separated relatively coarse or agglomerated bed particles from the system.

Another specific object of the invention is to provide an improved method and apparatus for establishing and maintaining optimum size patterns of solid particles in fluidized bed roasting operations in which finely divided metal sulfide ore, and particularly finely divided zinc sulfide ore, is converted to $SO_2$ gas and the corresponding metal oxide.

Still another specific object of the invention is to provide an improvement in the fluidized bed roasting of metal sulfide ores to $SO_2$ gas and metal oxides whereby the metal sulfide ore is more efficiently converted to a corresponding metal oxide which possesses a very low residual sulfur content.

Other objects and advantages of the invention will become apparent from the following description.

*Summary of the invention*

This invention relates generally to a method and apparatus for controlling particle size in fluidized beds and more particularly, relates to a method and apparatus for removing relatively coarse or agglomerated solid particles from a fluidized bed containing the same, thereby decreasing the average bed particle size therein, and for establishing and maintaining certain optimum size patterns of solid particles in fluidized bed systems.

In a preferred embodiment the invention relates to a method and apparatus for removing relatively coarse or agglomerated roasted or partially roasted metal sulfide ore particles from a fluidized bed reactor containing the same and for establishing and maintaining an optimum size pattern of such particles in fluidized bed roasting operations in which finely divided metal sulfide ore is converted to $SO_2$ gas and the corresponding metal oxide.

In accordance with the invention it has been discovered that relatively coarse or agglomerated particles may be selectively removed from a bed containing them and smaller particles of size within the range desired for the process being effected within the bed. In practice of the invention, solid charge is admitted to a fluidized bed at a laterally localized inlet to flow laterally across the bed while being subjected to the classifying effect of a fluidizing gas passing upwardly therethrough. At a point laterally remote from the inlet, a small quantity of solid, concentrated in relatively large particles, is flowed by gravity selectively from a low point in the bed, preferably its bottom, into and downwardly through a restricted column openly communicating at its top with the bed bottom. Gas at sufficient velocity to maintain the column of relatively coarse particles fluidized, and higher than the velocity of fluidizing gas passing through the bed, is admitted to the bottom of the column to discharge directly into and to flow upwardly through the bed. It has been discovered that by this method particles of undesired coarseness, and substantially free of more finely divided particles of desired size, may be withdrawn selectively from the system. It has been discovered further that the gas of relatively high velocity entering the bed from the column, rather than creating localized geysering or channeling of the fluidized bed as might be expected, actually contributes to the uniformity of fluidizing conditions within that bed.

The invention finds particular application in the fluidized roasting of sulfur bearing ores, such as finely divided pyrite, pyrrhotite, copper or zinc ores, or flotation concentrates obtained from said ores, under temperature conditions such that the cinder formed by the burning tends to agglomerate. The agglomerates, unless controlled in concentration within the fluidized bed, tend seriously to interfere with satisfactory bed operation. Their removal is essential to avoidance of formation of large clinkers or of excessive carry-over of difficult to separate fines with flue gases exiting the burners. No entirely satisfactory method of removing such agglomerates without aggravating either or both of these conditions has heretofore been devised.

More specifically, the process of the invention is carried out in a suitable fluidized bed operation in which a fluidized bed of solid particles is typically maintained on a grate in a fluidization chamber by means of supplying finely divided solid particles to the bed and by passing a fluidizing gas upwardly though the bed at a velocity to fluidize the solid particles; by providing a column of solid particles located below the bed to receive particles by overflow from the lower portion of the bed, by passing a fluidizing gas upwardly through the column at a velocity sufficient to maintain the column contents fluidized and higher than that employed in the bed, and by withdrawing from the system the relatively coarse or agglomerated bed particles which have settled into and through the column.

Apparatus provided to carry out the above operations includes the following conventional components: a first fluidization chamber, a first perforated plate or member disposed in the first fluidization chamber adapted to support a fluidized bed of solids thereon, a feed inlet into the first fluidization chamber above the first perforated plate for the introduction of finely divided solid particles, an inlet into the first fluidization chamber below the first perforated plate for the introduction of fluidizing gas to maintain a bed of solids on the first perforated plate in a fluid state, and an outlet in the upper portion of the first fluidization chamber to permit discharge therefrom of gas and finely divided suspended solid particles. Additionally, as provided in accordance with the invention, the apparatus includes: a second smaller fluidization chamber embodied within the first fluidization chamber which second fluidization chamber is open at the top, extends through the first perforated plate and is so positioned and dimensioned that solid particles from the first fluidization chamber will overflow into the second fluidization chamber; a second perforated plate or member disposed in the second fluidization chamber adapted to support a fluidized bed of solid particles thereon; an inlet into the second fluidization chamber below the second perforated plate for the introduction of fluidizing gas to maintain a bed of solids on the second perforated plate in a fluid state; and an outlet superadjacent the second perforated plate for the discharge therethrough of relatively coarse or agglomerated solid particles.

The term "superficial velocity," as used herein is to be given its usual meaning as is understood by persons of ordinary skill in this art. Simply stated it refers to the velocity of the gas through the bed based upon the total cross sectional area of the bed (i.e., without allowance for space occupied by the bed material) at the actual pressure and temperature of the fluidizing gas. It can be calculated by dividing the volume of the fluidizing gas being passed through the bed in lbs./sec. by its actual density under the operating conditions of pressure and temperature in lbs./ft.$^3$ and dividing the result by the calculated cross sectional area (in a horizontal plane) of that section of the chamber at which the velocity is to be determined.

The method and apparatus of the invention may be employed in any fluidized bed procedure in which operation is improved by the elimination or reduction in number of relatively coarse or agglomerated particles, by merely controlling the superficial velocity of the second fluidizing gas in relation to the superficial velocity of the first fluidizing gas, as described heretofore, so that a greater or lesser number and size of such particles are arbitrarily removed. Depending upon other conditions, usually some degree of improvement in operation will result; such as, for example, an increase in the conversion of reactant to desired product or an increase in the feed rate which can be tolerated for a given product quality.

In order to make most effective use of the invention process and apparatus, however, the optimum size pattern of the particles making up the first fluidized bed of the particular procedure involved should be determined, and this size pattern should be established and maintained in the first fluidized bed by controlling and adjusting the relative superficial velocities of the first and second fluidizing gases. Determination of the optimum size pattern for a particular bed of particles for purposes of use according to the invention process may be accomplished by starting with the same superficial velocity of fluidizing gas in the second bed as is necessary to be used in the first bed to effect fluidization therein and increasing the superficial velocity of the fluidizing gas to the second bed in small, e.g., 10% increments at sufficiently long intervals, while keeping other variables essentially constant, so that the effect upon the fluid bed particle size, production capacity and quality of the product can be evaluated. The optimum bed size pattern for the particular result desired can then be determined, such as by conventional screening techniques.

To take an illustration, in one commercial zinc sulfide ore roasting operation, to be described more in detail hereinafter, it was determined that, under the conditions at which the operation was carried out, bed particles more coarse than 28 mesh on the U.S. Standard screen were undesirable if present to an extent above 5% by weight of the entire bed. It was further determined by the method described above that, under these conditions, the optimum particle size pattern in the bed should include about equal fractions, on a weight basis, of particles fairly distributed over each of −35+48, −48+65 and −65+100 mesh ranges and also a fraction in the −28+35 mesh range being in the order of ½ to ⅓ also on a weight basis, of any of the above three fractions. For illustrative purposes, following Table I shows two typical screen analyses, one representing a pattern which would give good zinc sulfide ore roasting and the other which would result in poor roasting under typical roasting conditions. As between the two patterns the "good" pattern can result in removal of as much as 1% more of the residual sulfur in the metal oxide or cinder product or, for the same residual sulfur content, can increase system capacity by as much as 25%.

TABLE I

| Fraction | Good | Poor |
|---|---|---|
| +10 | 0.5 | 7 |
| −10+20 | 2 | 37 |
| −20+28 | 2 | 34 |
| −28+35 | 10 | 10 |
| −35+48 | 27 | 4 |
| −48+65 | 25 | 4 |
| −65+100 | 26 | 3 |
| −100 | 8 | 1 |

Determination as to whether the optimum size pattern is being maintained in the bed may be made by periodically sampling the bed and determining the screen sizes of the samples. An approximation of size pattern may also be made, under certain circumstances, by determination of the average particle size at a given time. Deviations from optimum size pattern will also be apparent from loss of productivity and from lowering of product quality when variables other than particle size are unchanged.

Should a given bed reach a condition wherein the size pattern would be classified as poor due to the predominance of relatively coarse particles, one would operate the second bed at a superficial velocity much higher than the superficial velocity in the first bed in order to withdraw the very coarse material and to minimize the amount of time needed to attain the optimum size pattern. Coarse material is withdrawn from the bed at a rate which, relative to the feed rate and new agglomerated particles being formed, is required to maintain the desired bed level. As the desired bed composition is approached, the superficial velocity in the second bed would be reduced accordingly until finally an equilibrium is established which will result in maintenance of the optimum size pattern of bed material. At times there may be an undesirable degree of build-up of relatively fine particles with respect to the optimum size pattern, particularly if the difference in superficial velocity between the beds is too great and under such circumstances it may no longer be desirable to withdraw relatively coarse particles from the system. In this event, bed particles should still be withdrawn from the second bed with a superficial velocity of fluidizing gas in the second bed being equal to or even less than the superficial velocity of the fluidizing gas in the first bed. This is in order to avoid potential blocking of the second fluidizing chamber by a chemical reaction which could cement the second bed into a solid mass. Make-up of relatively coarse particles to reachieve the optimum size pattern can then be accomplished by agglomerization of particles within the bed itself or even by adding suitably sized ore particles or inert sands. In view of the above, it will be apparent that there is no way of arbitrarily setting and fixing the actual operating superficial velocity in the second bed, and that accordingly, such will be empirical with such velocity being controlled and varied depending upon requirements of the system at the time.

Further description of the process and apparatus of the invention, both as to general application and as to the preferred embodiment of the invention, viz., fluidized bed roasting of metal sulfide ores, will now be made by numbered references to the drawings in which.

Figure 1:
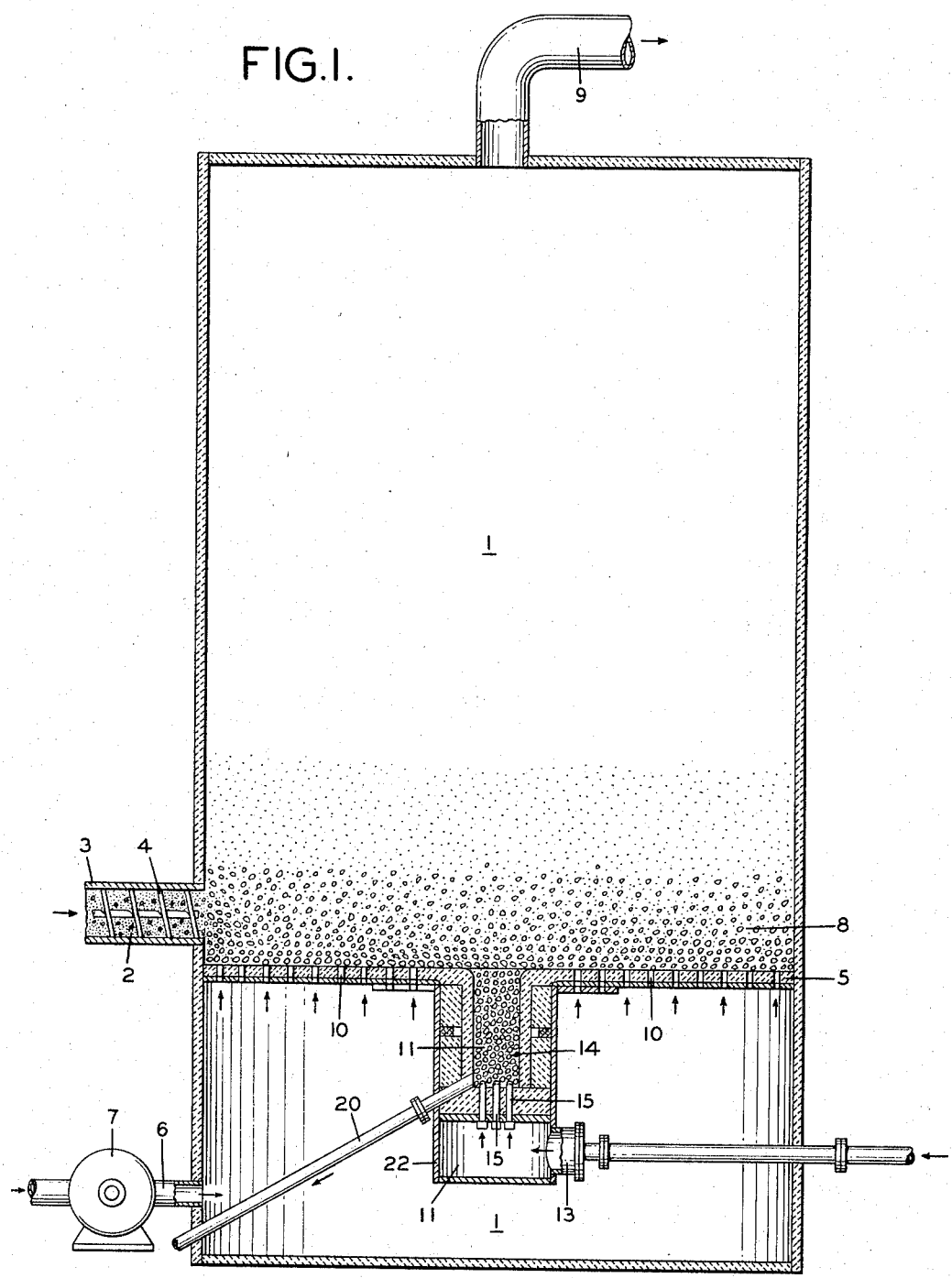
FIG. 1 is a sectional elevation of a preferred form of the invention as embodied in an otherwise conventional apparatus.

Referring to the drawings and with particular reference to FIGS. 1 and 2, chamber 1 is a conventional reaction chamber, hereinafter also referred to as first fluidizing chamber or first chamber, within which contact of a gas and a solid 2 is achieved by introducing the solid, in finely divided form, into the chamber through one or more feed inlets such as 3, by means of screw 4 above a perforated member or grate 5, hereinafter also referred to as first grate; passing a fluidizing gas into the lower region of the first chamber below grate 5 through a first fluidizing gas inlet 6, such as by means of fan 7, and upwardly through grate 5 to fluidize and maintain a bed 8, hereinafter also referred to as first fluidized bed or first bed, on top of grate 5. The apparatus shown is particularly adapted for the roasting of metal sulfide ores, but is suitably illustrative for demonstrating the principle and operation of the invention for any suitable application.

The particle size and distribution of particles making up the solid feed material will of course vary depending on the nature of the available feed and upon pre-sizing operations, if any, keeping in mind the optimum size patterns which are desired to be maintained in the bed.

Grate 5 may be any perforated member conventionally used for this purpose in the art. The number of perforations 10 therein is not critical, however generally, for effective distribution of fluidizing gas, a large number is preferred. For the same reason, the perforations should be uniformly distributed throughout the plate. Grate 5 may be disposed horizontally as shown in the drawings, or it may, if desired, be slanted so as to facilitate migration of relatively coarse bed particles into chamber 11, which latter chamber will be described in more detail hereinafter. Additionally, perforations 10 in grate 5 may optionally be provided with further distribution means such as tuyeres 15, which also will be described in more detail hereinafter.

As indicated above, and preferably, there may be a plurality of feed inlets, as inlet 3, in order to facilitate distribution of the feed material over plate 5. Expediently, four are provided equidistantly spaced from each other. Only one such feeder has been shown on the drawing to avoid undue detail. Similarly, there may be more than one inlet, such as inlet 6, for the introduction of fluidizing gas.

Chamber 1 is further equipped with an outlet 9 for discharge of gases and suspended solid particles. This chamber may also be equipped with or connected to a number of other means or devices needed to perform a variety of specific essential functions depending upon the particular operation being performed. For the sake of clarity it has not been attempted to show such other means or devices on the drawing. However, such could include, for example, a waste heat boiler for the cooling of gases exiting outlet 9 and for the recovery and utilization of heat therefrom, electrostatic precipitators, cyclones or other separating devices for removing suspended solid particles from gases, and various inlets and outlets for the addition of water, acids, other liquids or recycle gases to control temperatures in various parts of the chamber.

The first fluidizing gas will be the gas which it is desired to contact with the solid material to effect the sought-for chemical or physical change and thus will serve in a dual capacity. Another make-up fluidizing medium may be employed. In the roasting of metal sulfide ore the fluidizing and reacting medium will, of course, be air or some other oxygen-containing gas.

The nub of the invention lies in the provision of a second smaller chamber 11, hereinafter also referred to as second fluidizing chamber or second chamber, which second chamber is open at the top and is so dimensioned and positioned within the first chamber that it will be supplied with bed particles by overflow of the same from the bottom of the first chamber into the second chamber. Thus the second chamber will extend through perforated plate 5 of the first chamber and will communicate at its top with first fluidized bed 8, with the open top of the second chamber being in a plane with first grate 5. In its horizontal disposition, the top of chamber 11 may pass through anywhere on grate 5. For preferred operation, the top of chamber 11 should be located at a point remote from the point or points at which the finely divided feed is supplied to chamber 1. It follows that when a plurality of equidistantly spaced feed inlets are employed; the top of chamber 11 should be in the center of grate 5. On the other hand, if one feed inlet is employed, as shown on the drawing, the top of chamber 11 should be located towards or at the opposite end of grate 5.

Like the first fluidization chamber, second fluidization chamber 11 is provided with a perforated member or grate 12, hereinafter also referred to as second perforated grate or second grate, and also with an inlet 13 below second grate 12 for the introduction therethrough of a second fluidizing gas for passage upwardly through second grate 12 and into the upper portion of second chamber 11 for the maintenance on top of second grate 12 of a second fluidized bed 14, hereinafter also referred to as second bed, of solid particles supplied from first fluidized bed 8.

Figure 2:
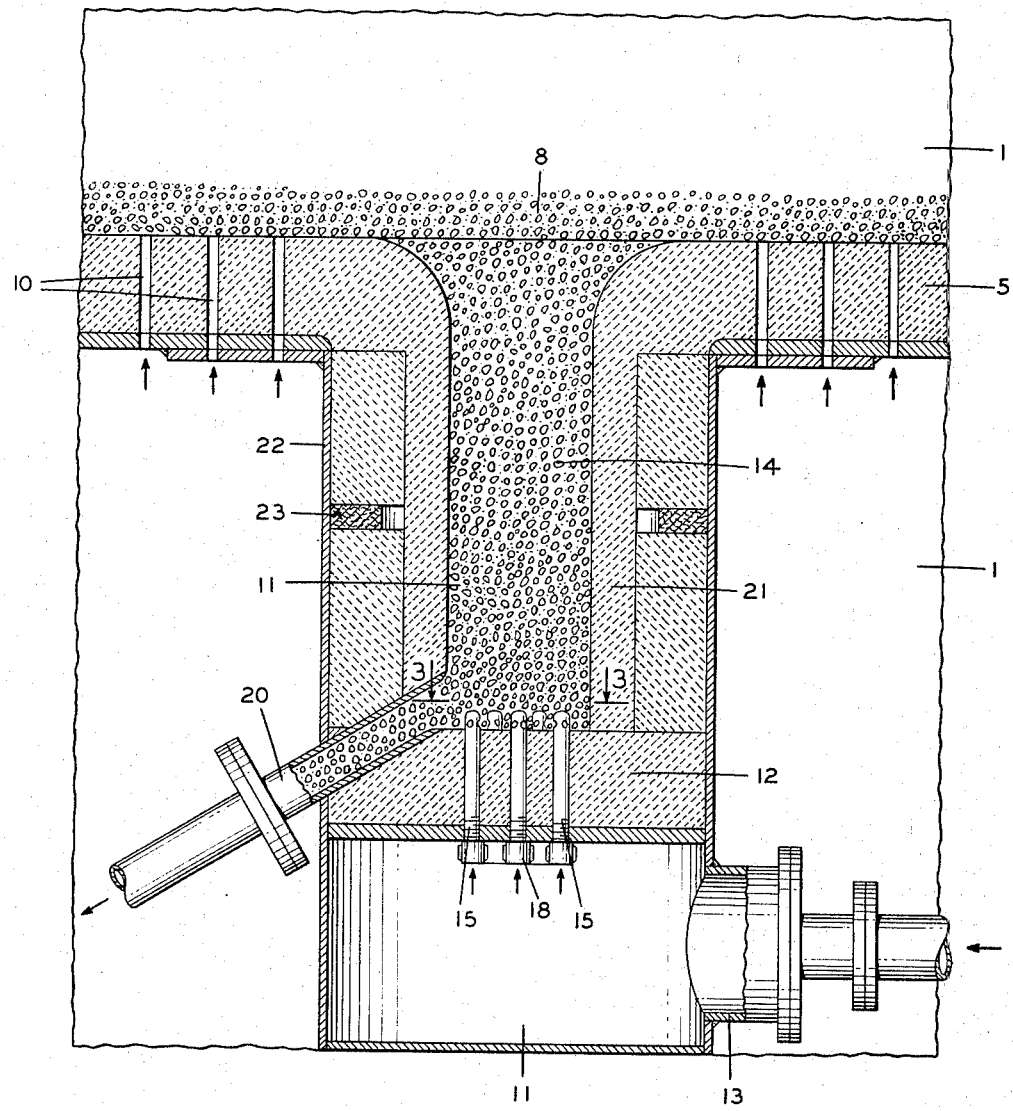
FIG. 2 is a similar view in larger scale limited essentially to the inventive portion of the apparatus.
Figure 3:
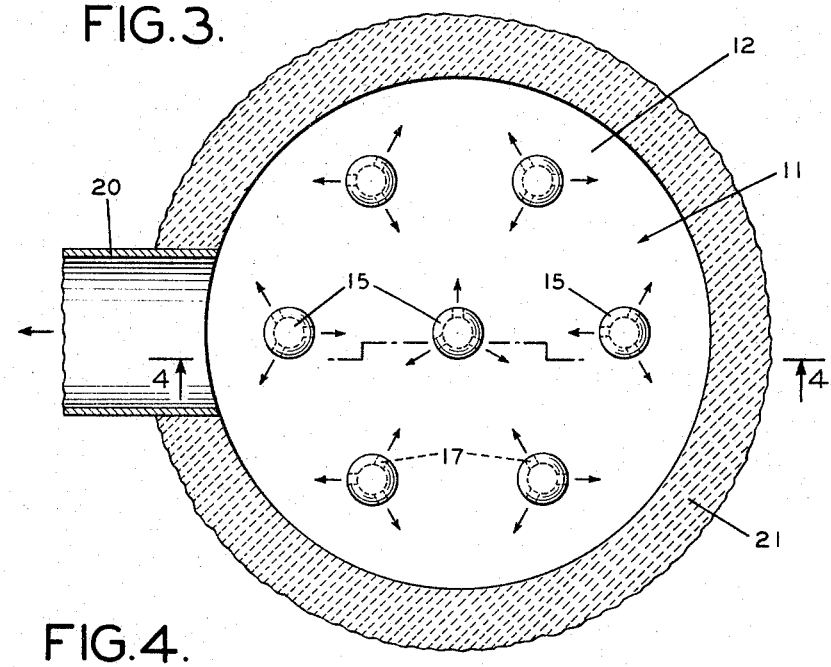
FIG. 3 is a plan view in section taken along line 3—3 of FIG. 2 showing the juxtaposition of the preferred fluidizing medium tuyeres.
Figure 4:
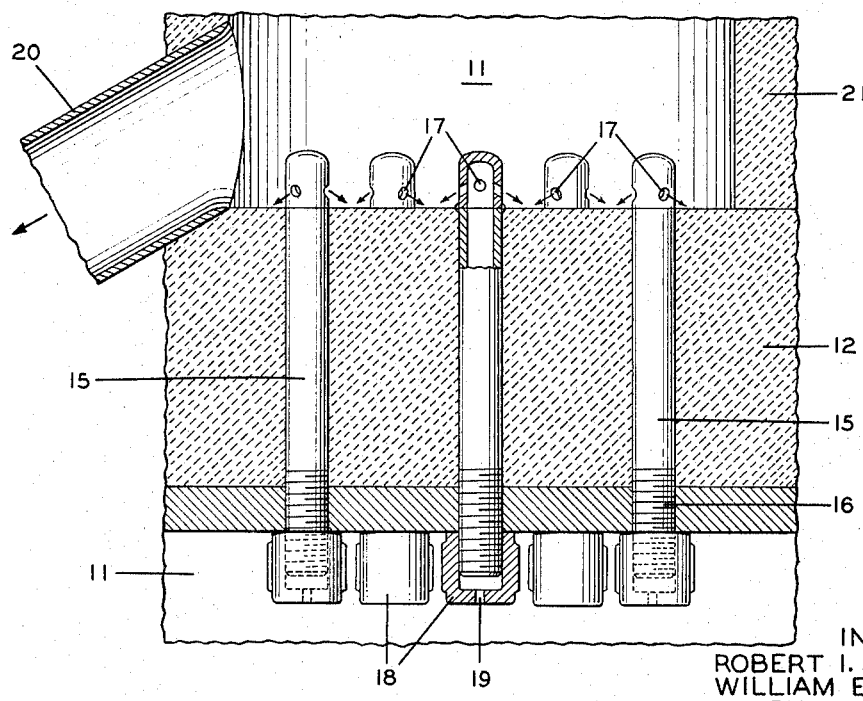
FIG. 4 is a vertical view in section taken along line 4—4 of FIG. 3 showing details of the preferred fluidizing medium tuyeres.

Second perforated grate 12 may be analogous in structure to first perforated grate 5, or in a preferred embodiment, it may further be provided with a number of tuyeres 15 as shown in FIG. 1 and in more detail in FIGS. 2–4. With particular reference to FIG. 4, tuyeres 15 may be provided with threads 16 to facilitate installation in grate 12. As can be seen from the FIG. 4, the tuyeres are closed at the top and are provided with fluidizing gas distributing nozzles 17 which are inclined downwardly. The tuyeres may each contain a suitably restricted orifice at the bottom to control the passage of fluidizing gas therethrough. Flexibility, however, is afforded by providing sizing overcaps 18 which in turn possess sizing orifices 19. When it is desired to change the size of orifices 19, it is only necessary to remove overcaps 18 and substitute others with the desired sized orifices.

Good distribution of fluidizing gas is particularly important in chamber 11 and generally, the greater the number of tuyeres and/or perforations—the better the design. The perforations or tuyeres should be positioned uniformly over second grate 12. Satisfactory orientation for seven tuyeres is shown in FIG. 3.

Second fluidization chamber 11 is further provided with an outlet 20, for the withdrawal of coarse or agglomerated bed particles, which preferably is located immediately superadjacent second perforated grate 12. The coarse particles can be withdrawn from chamber 11 through outlet 20 by the pressure of the fluidizing medium. For best results, however, some other means, such as a variable speed screw conveyor (not shown on the drawing), should be employed.

The dimensions of second fluidization chamber 11 in relation to first fluidization chamber 1 are not absolutely critical. As no chemical reaction is necessary therein retention time is of minor import and accordingly diameter is not critical. The second chamber should, however, not have a diameter so small that it may be readily blocked by any probable accretions. On the other hand, as the velocity of the fluidizing medium will be fixed, depending on the degree of separation of bed particles desired, too great a diameter will be costly in requiring excessive amounts of fluidizing medium. For the purpose of establishing a frame of reference, it can be said that a suitable diameter for chamber 11, for use in a chamber 1 which is from about 5–30 ft. in diameter, would be about nine inches. As a rule of thumb, the height (L) of chamber 11 above grate 12 should be such as to provide an $L/D$ ratio of at least 3. Increasing the $L/D$ ratio to up to about 6 will normally improve separation of bed particles, but this upper figure is not critical. The depth of chamber 11 below grate 12 is not critical. For obvious reasons the diameter of outlet 20 should be sufficiently large to permit the ready discharge therethrough of the size of coarse or agglomerated particles which will be removed from the system.

In operation of the apparatus, solid particles from bed 8 will overflow into and flood the upper portion of chamber 11 thus supplying second bed 14 with bed particles, and fluidizing gas will be passed upwardly through second bed 14 at the velocity needed to effect the desired separation of bed particles. The second fluidizing gas employed in this portion of the apparatus has essentially as its sole purpose, that of fluidizing bed 14 and virtually any gas which would not cause deleterious results, with the reactants and materials present and under the particular conditions used, may be employed. The choice of second fluidizing gas will therefore be based on such factors as economics, chemical characteristics and physical considerations. Normally air, since it is readily available, cheap and relatively inert, is ideal for this purpose. Other gases which may be employed, depending upon the nature of the procedure, include steam, nitrogen, oxygen and sulfur dioxide.

Depending on the relative velocities of the first and second fluidizing mediums, fines of certain size will either remain in bed 8, or if present in bed 14, will be carried into and above the top region of second chamber 11 and will thus be returned to bed 8 in chamber 1.

Velocities of the fluidizing gases employed in the first and second chambers will be a function primarily of the size, density, shape and nature of the bed particles and also of the degree of separation between fine and coarse particles desired. In most applications, however, it will be found that superficial velocities in the first chamber will generally vary between about 0.5–4 feet per second, with corresponding superficial velocities in the second chamber required to effect any appreciable amount of separation, being at least about ½ foot per second higher throughout the range, i.e., between about 1–4.5 feet per second. Optimum fluidizing velocity for zinc sulfide ore roasting has been found to be between about 2–3.5 feet per second in the first chamber with velocities between about 2.5–4 feet per second in the second chamber.

As pointed out heretofore, there are times when separation of bed particles is not required, at which times the second bed is still kept fluidized in order to maintain material flow. The minimum velocity required to effectuate this purpose is empirical as it will vary with the characteristics of the particles and the fluidizing medium; however, it can readily be established by one of ordinary skill in the art by observation of flow meters, pressure gauges and temperature indicators as may be provided.

Materials of construction of the apparatus are those which will withstand the necessary exposure to chemical attack, heat and corrosion or abrasion. Cast refractory is employed where possible, such as lining 21, as may be seen in FIG. 2. Elsewhere, such as wall 22, a suitable alloy or mild steel if possible is employed, depending upon the nature and degree of exposure on that surface. A suitable packing 23, such as of fibre frax rope, may be employed, as shown in FIG. 2, to provide a baffle between refractory and steel, in order to minimize the possibility of hot gases short circuiting the steel wall.

Operating pressures and temperatures and depths of first fluidizing bed maintained, will depend on the requirements of the particular procedure employed and will be governed by those considerations normally taken into account for that procedure. Superatmospheric or subatmospheric pressure, as may be required, may be employed in the chambers with suitable structural modifications as may be necessary to accommodate the same. The pressure at grate 5 should at least be sufficient to overcome the resistance of bed 8 and the pressure of the system above bed 8. It can be of such additional magnitude as to facilitate circulation of gases exiting outlet 9 through various gas handling equipment which may be connected, such as waste heat boilers, cyclones and the like.

The following example for the fluidizing bed roasting of zinic sulfide ore illustrates the practice of the invention:

Apparatus employed is of the type shown in FIGS. 1–4 of the attached drawings. First fluidization chamber 1 has a diameter of 17 feet, 8 inches, a cross-sectional area of 244 square feet, a height of 50 ft. above grate 5 and a depth of 4 ft. below grate 5. Zinc sulfide ore concentrates containing 54% zinc, 34% sulfur, 11% iron, and the balance gangue (these percentages are on a dry basis; the ore will also contain about 3% moisture) with a particle size distribution of 11.8–26.9% of +200 mesh; 16.1–12.3% of —200+325 mesh and 72.2–50.8% of —325 mesh, are fed to chamber 1, at a height of one foot above first grate 5 through four equidistantly spaced inlets, at the rate of 225 tons per day. The second chamber is located in the center of first grate 5, with its top on a plane with grate 5 as shown in FIG. 1, and has a diameter of 9 inches, a cross-sectional area of 64 square inches, a height above grate 12 of 30 inches and a depth below grate 12 of 9 inches. Fluidization bed 8 and the suspension zone above the bed are operated at about 1700° F. Pressure at grate 5 is about 7 p.s.i.g. The first fluidizing gas is air and is passed upwardly through first grate 5 and first bed 8 at a superficial velocity of 2.68 feet per second. The second fluidizing gas is also air and is passed upwardly through second grate 12, tuyeres 15 and second bed 14 at a superficial velocity of 3.5 feet per second. About 5% of the total cinder product is removed from the system throughout outlet 20 with the balance exiting overhead through outlet 9 with about 85% of the overheads being caught in a waste heat boiler and electrostatic precipitators.

The particle size distribution of the cinder product removed is 8% of +10 mesh; 41% of —10+20 mesh; 39% of —20+28 mesh; 10% of —28+35 mesh; 1% of —35+48 mesh; 1% of —48+65 mesh; and 0% of —65 mesh. During operations fluidized bed 8 is maintained at a depth of about 4–5 ft. above grate 5 and possesses a size pattern substantially within the optimum size pattern for the roasting of zinc sulfide ore described heretofore. The overhead gases exiting the system through outlet 9 have a volume of about 13,400 c.f.m. at standard conditions composed, on a dry basis, of about 9% sulfur dioxide, 5% oxygen and 86% nitrogen. The sulfide sulfur content of the overall cinder product recovered from the system is .16%.

When the above described operation is carried out, exactly as described, excepting that the superficial velocity of the second fluidizing gas is equal to the superficial velocity of the first fluidizing gas, i.e., 2.68 ft. per second; the particle size distribution of the cinder product removed is substantially different and the sulfur content of the overall cinder product is 1.18%.

Although for purpose of illustration the invention has been most specifically described with reference to the fluidized bed roasting of metal sulfide ores and particularly zinc sulfide ore, along with certain preferred embodiments involved therein; it will be evident that the invention may be applied to a wide variety of fluidized bed operations, as described heretofore, and that various changes and modifications may be made without departing from the scope and spirit of the invention.

We claim:
1. In a fluidized bed system in which a first fluidizing gas is passed upwardly through a bed of finely divided solid particles to maintain the same in a fluidized state and in which to improve operation, relatively fine bed particles are separated from relatively coarse or agglomerated bed particles, the separated relatively coarse or agglomerated bed particles are removed from the system and the separated relatively fine bed particles are returned to the system; the improvement which comprises effecting such operation, removal of coarse or agglomerated particles and return of fine particles by a procedure comprising:
   (a) feeding finely divided solid charge to and across the bed from a laterally localized inlet,
   (b) flowing relatively coarse or agglomerated bed particles downwardly from the bottom of the bed, at a point laterally remote from the laterally localized inlet, through a restricted column openly communicating at its top with the bed bottom and
   (c) passing a second fluidizing gas upwardly through the column at a sufficient velocity to maintain the relatively coarse or agglomerated particles in the column in a fluidized state, which velocity is higher than the velocity of the first fluidizing gas and which velocity is further
   (d) controlled so as to cause particles of undesired coarseness to settle to the bottom of the column and to cause particles of desired fineness to be carried above the column and back into the portion of the bed above the column and (e) withdrawing from the bottom of the column the particles of undesired coarseness.

2. The process according to claim 1 in which the second fluidizing gas is the same as the first fluidizing gas.

3. The process according to claim 1 in which the finely divided solid charge is fed to the bed at a point below the surface of the bed.

4. In a fluidized bed process for converting finely divided particles of metal sulfide ore into sulfur dioxide and low sulfur cinder in which process a first fluidized bed of metal sulfide ore particles is maintained on a first grate in a first chamber by means of supplying finely divided metal sulfide ore particles to the first chamber above the first grate and by passing a first fluidizing gas upwardly through the first grate at a velocity sufficient to fluidize the metal sulfide ore particles and wherein improved results are obtained by separating relatively coarse or agglomerated bed particles from relatively fine bed particles, returning the separated relatively fine bed particles to the system and removing the separated relatively coarse or agglomerated bed particles from the system; the improvement which comprises effecting such separation, returning relatively fine bed particles to the system, and removing relatively coarse or agglomerated bed particles from the system by a procedure comprising:

(a) providing a second fluidized bed of solid particles on a smaller second grate in a smaller second chamber located below the first grate of the first chamber, which second chamber openly communicates at its top with the bottom of the first bed and which second chamber is supplied with bed particles by overflow of the same from the first chamber into the second chamber, (b) maintaining the second fluidized bed by passing a second fluidizing gas upwardly through the second grate at a velocity sufficient to maintain fluidity in the second chamber, which velocity is higher than the velocity of the first fluidizing gas, (c) further controlling the velocity of the second fluidizing gas, in relation to the velocity of the first fluidizing gas, so that relatively coarse or agglomerated bed particles in the second chamber settle to the region superadjacent the second grate and relatively fine bed particles in the second chamber are (d) carried into and above the top region of the second chamber and are thus returned to the first fluidized bed in the first chamber and (e) withdrawing from the system the relatively coarse or agglomerated bed particles which have settled to the region superadjacent the second grate.

5. The process according to claim 4 in which the separation, return of fine bed particles and removal of coarse or agglomerated particles operations are carried out so as to establish and maintain an optimum size pattern of solid particles within the first fluidized bed.

6. The process according to claim 4 in which the finely divided metal sulfide ore particles are supplied to the first chamber at a point remote to the point at which the relatively fine bed particles are returned to the first chamber.

7. The process according to claim 4 in which the top of the second chamber is on a plane with the first grate of the first chamber.

8. The process according to claim 4 in which the metal sulfide ore is zinc sulfide ore.

9. In a fluidized bed process for converting finely divided particles of zinc sulfide ore into sulfur dioxide and low sulfur cinder in which process a first fluidized bed of zinc sulfide ore particles is maintained on a first grate in a first chamber by means of supplying finely divided zinc sulfide ore particles to the first chamber above the first grate and by passing an oxygen containing gas upwardly through the first grate at a velocity sufficient to fluidize the zinc sulfide ore particles and wherein improved results are obtained by separating a relatively coarse or agglomerated bed particles from relatively fine bed particles, returning the separated relatively fine bed particles to the system and removing the separated relatively coarse or agglomerated bed particles from the system; the improvement which comprises:

(a) supplying zinc sulfide ore particles to the first chamber which have a particle size distribution of about 11.8–26.9% of +200 mesh, 16.1–12.3% of −200+325 mesh and 72.2–50.8% of −325 mesh, (b) passing the oxygen containing gas upwardly through the first grate at a superficial velocity of about 0.5–4 ft./sec., (c) providing a second fluidized bed of solid particles on a smaller second grate in a smaller second chamber located within the first chamber with the top of the second chamber in a plane with the first grate in the first chamber, the top of the second chamber being located at a point remote from the point at which finely divided zinc sulfide ore particles are supplied to the first chamber, which second chamber is supplied with bed particles by overflow of the same from the first chamber into the second chamber, (d) maintaining the second fluidized bed by passing a fluidizing gas upwardly through the second grate at a superficial velocity of about 1–4.5 ft./sec. but at a higher superficial velocity than the superficial velocity of the oxygen containing gas being passed through the first fluidized bed, (e) further controlling the superficial velocity of the fluidizing gas through the second grate, in relation to the superficial velocity of the oxygen containing gas through the first fluidized bed, so that bed particles in the second chamber more coarse than about 28 mesh, to the extent present above about 5% by weight of the bed, are caused to settle to the region superadjacent the second grate and so that there is (f) established and maintained in the first fluidized bed a size pattern of solid particles which includes approximately equal distribution of particles in the −35+48, −48+65 and −65+100 mesh ranges and additionally includes a fraction in the −28+35 range which, on a weight basis is equal to about ½ to ⅓ of the particles in any of the −35+48, −48+65 or −65+100 mesh ranges, (g) withdrawing from the region superadjacent the second grate relatively coarse or agglomerated bed particles at a rate required to maintain equilibrium for the desired bed level in the first chamber, and (h) allowing the relatively fine particles which have been separated from the relatively coarse particles to be carried into and above the top region of the second chamber whereby they are returned to the first fluidizing bed in the first chamber.

10. The process according to claim 9 in which the superficial velocity of the oxygen containing gas through the first fluidized bed is from about 2–3.5 ft./sec. and in which the superficial velocity of the fluidizing gas through the second grate is from about 2.5–4 ft./sec.

11. The process according to claim 9 in which both the oxygen containing gas and the fluidizing gas are air.

12. Apparatus for effecting roasting of finely divided zinc sulfide ore which comprises in combination:

(a) a first fluidization chamber, (b) a first perforated plate horizontally disposed in the lower region of the first fluidization chamber adapted to support a fluidized bed of zinc sulfide ore particles thereon, (c) a feed inlet into the first fluidization chamber above the first perforated plate for the introduction of finely divided zinc sulfide ore particles, (d) an inlet into the first fluidization chamber below the first perforated plate for the introduction of fluidizing gas to maintain a bed of zinc sulfide ore particles on the first perforated plate in a fluid state,
(e) an outlet in the upper portion of the first fluidization chamber to permit discharge therefrom of $SO_2$ and finely divided suspended solid particles,
(f) a second smaller fluidization chamber embodied within the first fluidization chamber which second fluidization chamber has a length/diameter ratio of at least 3, extends through the first perforated plate and has an open top, which open top is in a plane with the first perforated plate so that bed particles from the first fluidization chamber will overflow into the second fluidization chamber and which open top is located at a point remote from the feed inlet into the first fluidization chamber,
(g) a second perforated plate horizontally disposed in the lower region of the second fluidization chamber, possessing a distributor resistance of at least 2 pounds, adapted to support a fluidized bed of solid particles thereon,
(h) an inlet into the second fluidization chamber below the second perforated plate for the introduction of fluidizing gas to maintain a bed of solid particles on the second perforated plate in a fluid state, and
(i) an outlet superadjacent the second perforated plate for the discharge therethrough of relatively coarse or agglomerated bed particles.

References Cited

UNITED STATES PATENTS

| | | | |
|---|---|---|---|
| 2,586,818 | 2/1952 | Harms | 75—9 |
| 2,711,387 | 6/1955 | Matheson et al. | 209—474 |
| 2,774,662 | 12/1956 | Graham et al. | 75—9 |
| 2,855,288 | 10/1958 | Cyr et al. | 75—9 |
| 2,905,634 | 9/1959 | MacLaren et al. | 23—1 |
| 2,906,608 | 9/1959 | Jequier et al. | 75—9 |

BENJAMIN HENKIN, *Primary Examiner.*